United States Patent

Hoffmann et al.

[15] 3,686,369

[45] Aug. 22, 1972

[54] O-ALKYL-S-ALKYL-S-PHENYL-PHOSPHORODITHIOLATES

[72] Inventors: Hellmut Hoffmann, Wuppertal-Elberfeld; Hans Scheinpflug, Leverkusen, both of Germany; Toyohiko Kume; Kazuomi Yasui, both of Tokyo-to, Japan

[73] Assignee: Farbenfabriken Bayer Aktiengesellschaft, Leverkusen, Germany

[22] Filed: July 17, 1969

[21] Appl. No.: 842,702

[30] Foreign Application Priority Data

July 19, 1968 Japan.....................43/50851

[52] U.S. Cl. ................260/964, 424/225, 260/960
[51] Int. Cl. ..........................A01n 9/36, C07f 9/08
[58] Field of Search.........................................260/964

[56] References Cited

UNITED STATES PATENTS

| | | |
|---|---|---|
| 3,322,864 | 5/1967 | Schrader................260/964 X |
| 3,444,274 | 5/1969 | Schrader................260/964 X |

FOREIGN PATENTS OR APPLICATIONS

| | | |
|---|---|---|
| 98,101 | 2/1964 | Denmark...................260/964 |
| 983,886 | 2/1965 | Great Britain.............260/964 |

*Primary Examiner*—Joseph Rebold
*Assistant Examiner*—Richard L. Raymond
*Attorney*—Burgess, Dinklage and Sprung

[57] ABSTRACT

O-alkyl-S-alkyl-S-phenyl-phosphorodithiolates, i.e. O-alkyl-S-alkyl-S-(optionally chloro and methyl -substituted)- phenyl- -phosphorodithiolates or -dithiolphosphates, which possess fungicidal properties and which may be produced by conventional methods.

11 Claims, No Drawings

O-ALKYL-S-ALKYL-S-PHENYL-PHOSPHORODITHIOLATES

The present invention relates to and has for its objects the provision for particular new O-alkyl-S-alkyl-S-phenyl-phosphorodithiolates, i.e. O-alkyl-S-alkyl-S-(optionally chloro and methyl -substituted)-phenyl--phosphorodithiolates or -dithiolphosphates, which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

Heretofore, in controlling serious rice diseases such as blast and sheath blight, organic mercury compounds and organic arsenic compounds such as phenyl mercuric acetate, methyl arsonic acid, etc., which contain heavy metals harmful to man and cattle have been used widely, because they are excellent in their fungicidal effect and are comparatively economical to use. However, the use of organic mercuric compounds during the growing period of rice plants is objectionable from a public health standpoint because of the direct and indirect toxicity of these known compounds to mammals, especially humans.

Accordingly, inexpensive and effective compounds which do not contain any heavy metals harmful to man and cattle are urgently needed to combat rice diseases.

It has now been found, in accordance with the present invention, that the particular new O-alkyl-S-alkyl-S-phenyl-phosphorodithiolates of the formula

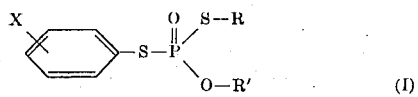

in which
R is alkyl of one–four carbon atoms,
R' is branched chain alkyl of four–eight carbon atoms or straight chain alkyl of seven–eight carbon atoms, and
X is hydrogen, chloro or methyl, exhibit strong fungicidal properties.

It is already known that symmetric O,S-dialkyl-S-phenyl-phosphorodithiolates possess insecticidal properties. For example, O,S-diethyl-S-(4-chloro-phenyl)-phosphorodithiolate (A) and O,S-diethyl-S-phenyl-phosphorodithiolate (B) are disclosed as an insecticide in German Pat. specification No. 1138041. An analogous compound, O-n-butyl-S-ethyl-S-benzyl-phosphorodithiolate (C) is also disclosed as a fungicide and insecticide in Nederlandish Pat. specification No. 6806844.

In copending U.S. Application Ser. No. 830,513 filed June 3, 1969 now abandoned, corresponding to Japanese Application Sho 41618/68 having a priority date of June 18, 1968, and of overlapping inventorship herewith, certain O-lower alkyl(-cycloalkyl)-S-alkyl-S-phenyl-phosphorodithiolates are disclosed and claimed which possess fungicidal properties, i.e. O-n-butyl-S-methyl-S-(4-chloro-phenyl)-phosphorodithiolate and O-n-butyl-S-methyl-S-phenyl-phosphorodithiolate.

It has been furthermore found, in accordance with the present invention, that a process for the production of the compounds of formula (I) above may be provided, which comprises reacting an O-alkyl-S-alkyl-thiolphosphoryl halide of the formula

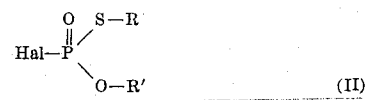

in which
R and R' are the same as defined above, and
Hal is a halogen atom such as chloro, with a thiophenol or thiophenol salt of the formula

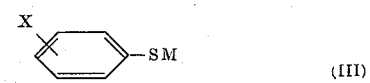

in which
X is the same as defined above, and
M is hydrogen or alkali metal such as sodium.

Surprisingly, the particular new phosphorodithiolates of formula (I) above according to the present invention exhibit an excellent fungitoxic effectiveness, especially for agricultural and horticultural purposes, more especially against rice diseases, and a certain insecticidal effectiveness, with a comparatively low mammalian toxicity and a concomitantly low phytotoxicity, whereas the known organic mercury and organic arsenic compounds used for these purposes as aforesaid are highly toxic to mammals. Therefore, the instant compounds represent a valuable contribution to the art.

The general process for the preparation of the instant compounds is illustrated by the following reaction scheme:

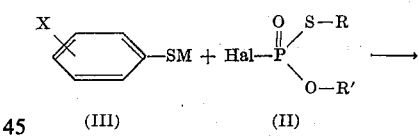

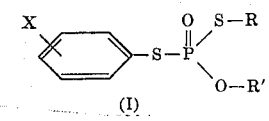

in which R, R', X, Hal and M are the same as defined above.

The starting materials to be used for producing the instant new compounds are already known and are clearly characterized by the formulas (II) and (III) noted above.

Advantageously, in accordance with the present invention, in the various formulas herein:
R represents
lower alkyl hydrocarbon of 1-4 carbon atoms such as methyl, 1-4 and iso-propyl, n-, iso-, sec.- and tert.-butyl, and the like, especially $C_{1-3}$ or $C_{1-2}$ alkyl;
R' represents
branched chain alkyl hydrocarbon of four–eight carbon atoms such as iso-, sec.- and tert.-butyl, isoamyl (i.e. 3-methyl-butyl), sec.-amyl (i.e. 1-methyl-butyl), tert.-amyl (i.e. 1,1-dimethylpropyl), iso-hexyl (i.e.4-methyl-pentyl), sec.-hexyl (i.e. 1-methyl-pentyl), tert.,-hexyl (i.e. 1,1-dimethylbutyl), iso-heptyl (i.e. 5-methyl-hexyl), sec.-heptyl (i.e. 1-methyl-hexyl), tert.-heptyl (i.e. 1,1-dimethyl-pentyl), isooctyl (i.e. 6-methyl-heptyl), sec.-octyl (i.e. 1-methyl-heptyl), tert.-octyl (i.e. 1,1-dimethyl-hexyl), 1,3-dimethyl-butyl, 2-ethyl-butyl, 2,2-dimethyl-butyl, 1,2,2-trimethyl-propyl, 1,3-dimethyl-hexyl, 1,5-dimethyl-hexyl, 2,3,4-tri-methyl-amyl, 3-ethyl-4-methyl-amyl, and the like, especially $C_{4-8}$ or $C_{5-8}$ branched chain alkyl, and more especially $C_{4-6}$ or $C_{5-6}$ branched chain alkyl; or straight chain alkyl hydrocarbon of seven–eight carbon atoms such as n-heptyl, n-octyl, and the like, especially n-octyl;

X represents
hydrogen;
chloro; or
methyl;

X when chloro or methyl being in 2-, 3- or 4- position, and especially in 4- position;

Hal represents
halo such as chloro, bromo, fluoro and iodo, especially chloro; and M represents
an alkali metal atom such as sodium, potassium, lithium, and the like, especially sodium and potassium.

Preferably, R is methyl, ethyl or n- and, iso-propyl, R' is a branched chain alkyl of four–six carbon atoms, and X is hydrogen, methyl or chlorine.

As examples of thiolphosphoryl halides of formula (II) above which may be used as starting materials, there are mentioned: O-iso-butyl-S-methyl-, O-iso-butyl-S-ethyl-, O-sec-butyl-S-methyl-, O-sec.-butyl-S-ethyl-, O-(1,3-dimethyl-butyl)-S-methyl-, O-(i-methyl-hexyl)-S-ethyl-, O-(2-ethyl-butyl)-S-methyl-, O-(2-ethyl-butyl)-S-ethyl-, O-(2,2-dimethyl-butyl)-S-methyl-, O-(2,2-dimethyl-butyl)-S-ethyl-, O-(1,2,2-trimethyl-propyl)-S-methyl-, O-(1,2,2-trimethyl-propyl)-S-ethyl-, O-iso-butyl-S-iso-propyl-, O-n-octyl-S-ethyl-, and the like, thiolphosphoryl chlorides, bromides, etc.

As examples of thiophenols and corresponding alkali metal salts of formula (III) above which may be used as starting materials, there are mentioned:
thiophenol, 2-, 3- and 4- chloro-thiophenol, 2-, 3- and 4- methyl-thiophenol, and the corresponding sodium and potassium thiophenates, and the like.

The production process is preferably carried out in the presence of inert solvents (the term solvent including mere diluents).

Suitable inert organic solvents usable for carrying out the production process in this regard include hydrocarbons, such as benzene and benzine; chlorinated hydrocarbons, such as methylene chloride, ethylene chloride, carbon tetrachloride and dichlorobenzene; ethers, such as diethyl ether, dibutyl ether and dioxan; ketones, such as acetone, cyclohexanone and methylethyl ketone; and acetonitrile and dimethyl formamide; and the like.

The reaction temperature can be varied within a fairly wide range. In general, the reaction is carried out at substantially between about 0°–100°C, preferably between about 0°–80°C.

A basic substance, preferably a tertiary amine, such as triethylamine, pyridine, dimethyl-cyclohexylamine, dimethylaniline, dimethylbenxylamine, and the like, is advantageously employed as acid binding agent where the corresponding free starting thiophenol is used.

When carrying out the production process, approximately equimolar amounts of the starting reactants are used, but an excess of the acid binding agent is not harmful, i.e. where the free thiophenol is used. An inert organic solvent such as benzene may be employed and the reaction may be carried out, for example, in triethylamine as acid binding agent, at a temperature of about 0°–80°C, by dissolving the thiophenol and triethylamine in benzene and adding the thiolphosphoryl halide dropwise thereto.

After completion of the reaction (about 1–10 hours), the reaction mixture may be worked up in the usual manner, such as by washing the reaction mixture with water and thereafter with aqueous sodium carbonate solution, then drying with anhydrous sodium sulfate, and distilling off the benzene, The residue is in most cases a colorless or slightly yellow colored non-distillable oil which is soluble in organic solvents and only slightly soluble in water.

Advantageously, the particular new active compounds according to the present invention exhibit strong fungitoxic activity and are distinguished by a broad spectrum of activity. Their low toxicity to warm-blooded animals and their good compatibility with higher plants permits the instant new compounds to be used as plant protection agents against fungal plant diseases. In the concentration normally used for the control of fungi, the instant compounds do not damage cultivated plants.

Fungitoxic agents, such as the instant compounds, are usable in plant protection, i.e. agricultural and horticultural endeavors, for the control of fungi from the most diverse classes of fungi, such as Archimycetes, Ascomycetes Phycomycetes, Basidiomycetes and Fungi Imperfecti.

The particular new active compounds according to the present invention can be used for example against parasitic fungi, on above-the-soil parts of plants, fungi which cause tracheomycosis which attack the plant from the soil, seedborne fungi and soil-inhabiting fungi.

By reason of their excellent properties mentioned above, the particular new active compounds according to the present invention can also be used with good results against fungal diseases which hitherto had to be controlled with fungicidal agents containing heavy metals harmful to man and cattle, e.g. arsenic and mercury.

The instant active compounds have given particularly good results in the control of serious rice diseases including not only rice blast and brown spot, but also sheath blight. Thus, the instant compounds show an excellent activity against the fungi *Piricularia oryzae* (i.e. blast), *Cochliobolus miyabeanus* (i.e. brown spot) and *Pellicularia sasakii* (i.e. sheath blight), as well as against the fungi *Mycosphaerella melonis* (cucumber), *Alternaria kikuchiana* (pear), *Elsinoe ampelina* (grape), and the like.

In particular, the compounds of formula (I) above in which R is methyl, ethyl or n- and iso-propyl, R' is a branched chain alkyl of four–six carbon atoms, and X is hydrogen, chloro or methyl, possess especially marked effect against serious rice diseases such as the aforesaid blast, brownspot and sheath blight.

The active compounds according to the instant invention can be utilized, if desired, in the form of the usual formulations or compositions with conventional inert pesticidal diluents or extenders, i.e. inert conventional pesticidal dispersible carrier vehicles, to form solutions, emulsions, suspensions, emulsifiable concentrates, spray powders, oils, pastes, soluble powders, dusting agents, granules, tablets, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents and non-solvents, such as aromatic hydrocarbons (e.g. benzene, toluene, xylene, dimethyl napththalene, aromatic naphthas, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, diatomaceous earth, clay, montmorillonite, etc.), and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying or wetting agents, such as non-ionic and/or anionic emulsifying or wetting agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or herbicides, insecticides, acaricides, nematocides, bactericides, etc., including, especially fungicidal, organophosphorus compounds, carbamate compounds, dithiocarbamate compounds, organo-chlorine compounds, dinitro compounds, organic sulfur or copper compounds, substituted phenoxy compounds, chlorophenols, substituted diphenyl ethers, anilide compounds, ureas, triazines, antibiotics, and other known agricultural chemicals and/or fertilizers, if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent, and preferably 0.5–90 percent, by weight of the mixture, whereas carrier composition mixtures suitable for direct application or field application generally contemplate those in which the active compound is present in an amount substantially between about 0.001–10 percent, preferably 0.01–5 percent, by weight of the mixture. Thus, the present invention contemplates over-all compositions which comprise mixtures of a conventional dispersible carrier vehicle such as (1) a dispersible inert finely divided carrier solid, and/or (2) a dispersible liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally about 0.001–95 percent, and preferably 0.01–95 percent, by weight of the mixture.

Generally, the active compound is used in dosage amounts per unit area of substantially between about 15–1,000g, preferably 40–600g, and most preferably 40–100g, per 10 ares, irrespective of the presence or absence of such carrier vehicle.

The active compounds can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50–100 microns; or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of the active compound, or even the 100 percent active substance alone, e.g. about 20–100 percent by weight of the active compound.

In particular, the present invention contemplates methods of selectively killing, combating or controlling fungi, which comprise applying to at least one of (a) such fungi and (b) their habitat, i.e. the locus to be protected, a fungicidally effective or toxic amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, dressing, via incrustation; and the like.

Significantly, the fungicidal compositions of the present invention can be applied for example by spraying a dust formulation directly onto stems and leaves of plants; or by using the formulation as a seed-dressing; by spraying an emulsifiable concentrate, diluted with water, etc. to a desirable concentration, onto stems and leaves of plants; by suspending a wettable powder in water at a desirable concentration and spraying the formulation onto stems and leaves of plants; by applying granule formulations to the soil; and the like.

It will be realized, of course, that the concentration of the particular active compound utilized in admixture with the carrier vehicle will depend upon the intended application, the purpose for which the active compound is used, and the like. Therefore, in special cases, it is possible to go above or below the aforementioned concentration ranges and dosage amounts per unit area.

The following illustrate, without limitation, examples of formulations which may be used in accordance with the present invention:

FORMULATION A

Fifteen parts of instant compound (1), 80 parts of a mixture of diatomaceous earth and kaolin (1:5) and 5 parts of the emulsifier Runox (trade name of the product of Toho Kagaku Kogyo K.K., Japan: polyoxyethylenealkylarylether) are formulated into a wettable powder by crushing mixing. It is diluted with water at the concentration of 1 to 300 – 500 and applied by spraying to the phytopathogenic fungi and/or their habitat.

FORMULATION B

Thirty parts of instant compound (3), 30 parts of xylene and 30 parts of Kawakazol (trade name of the product of Kawasaki Kasei Kogyo K.K., Japan: aromatic hydrocarbons of high boiling point) and 10 parts of the emulsifier Sorpol (trade name of the product of Toho Kagaku Kogyo K.K., Japan; polyoxyethylenealkylarylether) are formulated into an emulsifiable concentrate by mixing and stirring. It is diluted with water at the concentration of 1 to 1,000 and applied by spraying to the phytopathogenic fungi and/or their habitat.

FORMULATION C

Two parts of instant compound (4) and 98 parts of a mixture of talc and clay (3:1) are formulated into a dust by crushing and mixing. It is applied as is by dusting to the phytopathogenic fungi and/or their habitat.

FORMULATION D 1.5 parts of instant compound (2), 2.0 parts of O,O-dimethyl-O-(3-methyl-4-methylmercapto-phenyl)-phosphorothioate, and 96.5 parts of a mixture of talc and clay (3:1) are formulated into a dust by crushing and mixing. It is applied in the same manner described in Formulation C.

The fungicidal effectiveness of the particular new compounds of the present invention is illustrated, without limitation, by the following Examples:

EXAMPLE 1

Piricularia test:
    liquid preparation of active compound

| Test method: | Liquid preparation of active compound |
|---|---|
| Solvent: | 1 part by weight acetone |
| Dispersing agent: | 0.05 part by weight sodium oleate |
| Other additive: | 0.2 part by weight gelatin |
| Water: | 98.75 parts by weight. |

The amount of the particular active compound required for the desired concentration of such active compound in the spray liquor is mixed with the stated amount of solvent, and the resulting concentrate is diluted with the stated amount of water containing the stated additive.

(i) Test for preventive effect:

Thirty rice plants about 14 days old are sprayed with the spray liquor containing the given active compound until dripping wet. The plants remain in a greenhouse at a temperature of 22° to 24°C. and at a relative atmospheric humidity of about 70 percent until they are dry. Such plants are then inoculated with an aqueous suspension of 100,000 to 200,000 spores/ml. of *Piricularia oryzae* and placed in a chamber at 24° – 26°C and 100 percent relative atmospheric humidity.

Five days after inoculation, the infestation of all the leaves present at the time of inoculation is determined as a percentage of the untreated but also inoculated control plants. 0% means no infestation; 100 percent means that the infestation is exactly as great as in the case of the control plants.

(ii) Test for curative effect:

In the above described test, which uses a liquid preparation of the particular active compound, the curative effect in addition to the protective effect of the compounds is also determined. The test for curative effect differs from the test procedure described above (which only provides evidence of the protective effect) insofar as the active compounds are applied not before, but only 16 hours after, inoculation. Compounds which show an activity when the test is conducted in this manner are in a position to kill the fungus after infection and thereby to exercise a curative action.

The particular active compounds tested, their concentrations and the results obtained can be seen from the following Table 1:

TABLE 1

Test results of fungicidal effect against rice blast (*Piricularia oryzae*)

| Active compound | Concentration of active compound in percent | Infestation (attack rate) in protective effect test | Infestation (attack rate) in curative effect test |
|---|---|---|---|
| Known compound (comparison): | | | |
| (A) 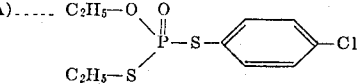 | 0.05 | 0 | 58 |
| | 0.025 | 0 | |
| Present compounds: | | | |

3,686,369

TABLE 1—Continued

Test results of fungicidal effect against rice blast

*(Piricularia oryzae)*

| Active compound | Concentration of active compound in percent | Infestation (attack rate) in protective effect test | Infestation (attack rate) in curative effect test |
|---|---|---|---|
| (1₁) C₆H₅–S–P(=O)(S–CH₃)(O–CH₂–CH(CH₃)–CH₃) | 0.05 / 0.025 | 0 / 0 | 25 / 0 |
| (2₁) C₆H₅–S–P(=O)(S–CH₃)(O–CH(CH₃)–CH₂–CH(CH₃)–CH₃) | 0.05 / 0.025 | 0 / 0 | 0 |
| (3₁) C₆H₅–S–P(=O)(S–C₂H₅)(O–CH(CH₃)–CH₂–CH₃) | 0.05 / 0.025 | 0 / 0 | 0 / 0 |
| (4₁) Cl–C₆H₄–S–P(=O)(S–CH₃)(O–CH(CH₃)–CH₂–CH₃) | 0.05 / 0.025 | 0 / 0 | |
| (5₁) C₆H₅–S–P(=O)(S–C₂H₅)(O–CH₂–CH(CH₃)–CH₃) | 0.05 / 0.025 | 0 / 0 | 0 |
| (6₁) CH₃–C₆H₄–S–P(=O)(S–C₂H₅)(O–CH₂–CH(CH₃)–CH₃) | 0.05 / 0.025 | 0 / 0 | |
| (7₁) C₆H₅–S–P(=O)(S–C₂H₅)(O–C₈H₁₇) | 0.05 / 0.025 | 0 / 17 | 25 |
| (8₁) C₆H₅–S–P(=O)(S–C₂H₅)(O–CH(CH₃)–(CH₂)₄CH₃) | 0.05 / 0.025 | 0 / 0 | 25 |
| (9₁) CH₃–CH₂–CH(CH₂CH₃)–CH₂–O–P(=O)(CH₃–S)–S–C₆H₄–Cl | 0.05 / 0.025 | 0 / 0 | 0 / 75 |
| (10₁) CH₃CH₂–CH(CH₂CH₃)–CH₂–O–P(=O)(C₂H₅–S)–S–C₆H₄–Cl | 0.05 / 0.025 | 0 / 0 | 58 |
| (11₁) CH₃CH₂–CH(CH₂CH₃)–CH₂–O–P(=O)(C₂H₅–S)–S–C₆H₅ | 0.05 / 0.025 | 0 / 0 | 0 / 9 |
| (12₁) CH₃–CH₂–CH(CH₂CH₃)–CH₂–O–P(=O)(CH₃S)–S–C₆H₅ | 0.05 / 0.025 | 0 / 0 / 0 | 0 / 0 / 0 |
| (13₁) (CH₃)(CH₃CH₂)(CH₃)C–CH₂–O–P(=O)(CH₃–S)–S–C₆H₅ | 0.05 / 0.025 | 0 / 0 | 0 / 100 |
| (14₁) (CH₃)(CH₃CH₂)(CH₃)C–CH₂–O–P(=O)(C₂H₅–S)–S–C₆H₄–Cl | 0.05 / 0.025 | 0 / 0 | 25 / 100 |

TABLE 1—Continued

Test results of fungicidal effect against rice blast (*Piricularia oryzae*)

| Active compound | Concentration of active compound in percent | Infestation (attack rate) in protective effect test | Infestation (attack rate) in curative effect test |
|---|---|---|---|
| (15₁) CH₃—CH₂—C(CH₃)(CH₃)—CH₂—O—P(=O)(S—C₂H₅)—S—C₆H₅ | 0.05 | 0 | 0 |
|  | 0.025 | 0 | 86 |
| (22₁) CH₃—CH(CH₃)—CH₂—CH(CH₃)—O—P(=O)(S—C₂H₅)—S—C₆H₄—Cl | 0.05 | 0 | 17 |
|  | 0.025 | 0 | 100 |
| (17₁) CH₃—C(CH₃)(CH₃)—CH(CH₃)—O—P(=O)(S—C₂H₅)—S—C₆H₄—Cl | 0.05 | 0 | 25 |
|  | 0.015 | 0 | 75 |
| (18₁) CH₃—CH(CH₃)—CH₂—CH(CH₃)—O—P(=O)(S—C₂H₅)—S—C₆H₅ | 0.05 | 0 | 0 |
|  | 0.025 | 0 | 42 |
| (19₁) CH₃—C(CH₃)(CH₃)—CH(CH₃)—O—P(=O)(S—C₂H₅)—S—C₆H₅ | 0.05 | 0 | 25 |
|  | 0.025 | 0 | 75 |
| (20₁) CH₃—C(CH₃)(CH₃)—CH(CH₃)—O—P(=O)(S—CH₃)—S—C₆H₅ | 0.05 | 0 | 0 |
|  | 0.025 | 0 | 0 |
| (21₁) CH₃—C(CH₃)(CH₃)—CH(CH₃)—O—P(=O)(S—CH₃)—S—C₆H₄—Cl | 0.05 | 0 | 0 |
|  | 0.025 | 0 | 100 |
| (23₁) CH₃—CH₂—C(CH₃)(CH₃)—CH₂—O—P(=O)(S—CH₃)—S—C₆H₄—Cl | 0.05 | 0 | 0 |
|  | 0.025 | 0 | 0 |
| (16₁) Cl—C₆H₄—S—P(=O)(S—CH₃)(O—CH(CH₃)—CH₂—CH(CH₃)—CH₃) | 0.05 | 0 | 0 |
|  | 0.025 | 0 |  |

EXAMPLE 2

Test against plant pathogens
(Agar dilution method)

The particular active compound is mixed in an agar culture medium of potato to form the desired concentration of active compound therein. After the medium is poured into Petri dishes of 9 cm in diameter and coagulated, the same are inoculated with the corresponding plant pathogens. Standard Petri dishes to which the active compound of Zineb (zinc-ethylene bis-dithiocarbamate) preparations are not added are also set up. After having been cultured at 27°C for 4 days, the growth condition of the plant pathogens is investigated and the concentration of the active compound (in ppm) for growth inhibition is determined.

The particular active compounds tested and the results obtained (i.e. the concentraion in ppm for growth inhibition) can be seen from the following Table 2.

TABLE 2

Test results of fungicidal effect against various plant pathogens
(Agar dilution method)

| Active Compound No. | Piricularia oryzae (rice), p.p.m. | Cochliobolus miyabeanus (rice), p.p.m. | Pellicularia sasakii (rice), p.p.m. | Alternaria kikuchiana (pear), p.p.m. | Elsinoe ampelina (grape), p.p.m. |
|---|---|---|---|---|---|
| (2₂) | 25 | 50 | 100 | 100 | 50 |
| (1₁) | 25 | 50 | 100 | 50 | 40 |
| (3₂) | 25 | 50 | 100 | 50 | 50 |

TABLE 2—Continued

Test results of fungicidal effect against various plant pathogens
(Agar dilution method)

| Active Compound No. | Piricularia oryzae (rice), p.p.m. | Cochliobolus miyabeanus (rice) p.p.m. | Pellicularia sasskii (rice), p.p.m. | Alternaria kikuchiana (pear), p.p.m. | Elsinoe ampelina (grape), p.p.m. |
|---|---|---|---|---|---|
| (16₂) | 50 | 100 | 100 | >100 | 100 |
| (4₂) | 50 | 100 | 100 | 100 | 100 |
| (24₁) | 25 | 50 | 100 | 50 | 50 |
| (25₁) | 50 | 100 | 100 | >100 | 100 |
| (6₂) | 50 | 100 | 100 | >100 | 100 |
| (7₂) | 100 | >100 | >100 | >100 | 100 |
| (8₂) | 100 | >100 | >100 | >100 | 100 |
| Zineb (standard) | 50 | 200 | 100 | 200 | 200 |

NOTE. Compounds of invention have corresponding numbers to those of Table 1 above and Table 3 below, as the case may be.

EXAMPLE 3

Test against rice blast/ (Piricularia oryzae) [Soil application]

Test method:

Fifty parts of test compound, 30 parts of xylene and 15 parts of emulsifier (polyoxyethylenealkylarylether) are mixed and stirred to form emulsifiable concentrates. It is diluted with water at the concentration of 1 to 300 and soaked in an amount of 500 g per 10 a of the active compound into the soil of pots of 12 cm in diameter in which paddy rice (Wase-Asahi) has been cultivated. After one day, an aqueous suspension of 100,000 to 200,000 spores/ml. of rice blast pathogen (Piricularia oryzae) is sprayed onto the rice plants of the so-soaked (i.e. treated soil) pots for the purpose of inoculation. The inoculated rice plants are then kept in the greenhouse for 7 days, and the number of diseased spots of rice blast, i.e. infestation, is investigated.

The particular active compounds tested and the results obtained can be seen from the following Table 3.

TABLE 3

Test results of fungicidal effect against rice blast

| | Active Compound | (Soil application) Amount of active compound g/10 a | Number of diseased spots per leaf | |
|---|---|---|---|---|
| | | | Top leaf | Second leaf |
| | Known compounds (Comparison) | | | |
| (B) | O-ethyl-S-ethyl S-phenyl-phosphorodithiolate | 500 | 9.8 | 6.8 |
| (C) | O-n-butyl-S-ethyl S-benzyl-phosporodithiolate | 500 | 9.5 | 5.7 |
| | Present compound | | | |
| (3₃) | O-sec-butyl-S-ethyl-S-phenyl-phosphorodithiolate | 500 | 0.5 | 1.5 |

The following further examples illustrate, without limitation, the process for producing the particular new compounds of the present invention.

EXAMPLE 4

(2₃)

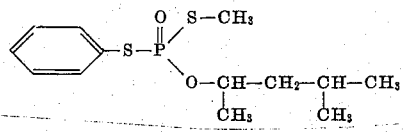

Eleven g of thiophenol and 10 g of triethylamine are dissolved in 200 ml of benzene. To this solution, 23 g of O-(1,3-dimethyl-butyl)-S-methyl-thiolphosphoryl chloride are added dropwise while cooling. After the addition, the mixture is stirred for 1 hour at room temperature and then stirred for a further 4 hours at a temperature of 60°C to complete the reaction. The organic layer is washed with water and thereafter with a 1 percent aqueous solution of sodium carbonate, and is finally dehydrated over anhydrous sodium sulfate. Upon distilling off the benzene and thereafter distilling the residue further, 25.8 g of pale yellowish oily O-(1,3-dimethyl-butyl)-S-methyl-S-phenyl-dithiolphosphoric i.e. O-(1,3-dimethyl-butyl)-S-methyl-S-phenyl-dithiolphosphoric acid ester, are obtained.

$n_D^{21} = 1.5528$.

| Analysis | S | P |
|---|---|---|
| Calculated: | 21.0% | 10.2% |
| Found: | 21.4% | 10.3% |

According to the same procedure as noted above, when O-(iso-butyl)-S-methyl-thiolphosphoryl chloride, O-(sec-butyl)-S-ethyl-thiolphosphoryl chloride, O-(sec-butyl)-S-n-propyl-thiolphosphoryl chloride, O-(1-methyl-heptyl)-S-ethyl-thiol-phosphoryl chloride and O-(1,2,2-trimethyl-propyl)-S-methylthiolphosphoryl chloride, respectively, is used instead of O-(1,3-dimethyl-butyl)-S-methyl-thiolphosphoryl chloride, the corresponding O-alkyl-S-alkyl-S-phenyl-phosphorodithiolate is obtained:

(1₂)  O-(iso-butyl)-S-methyl-S-phenyl-phosphorodithiolate
(3₄)  O-(sec-butyl)-S-ethyl-S-phenyl-phosphorodithiolate
(26₁)  O-(sec-butyl)-S-n-propyl-S-phenyl-phosphorodithiolate
(8₃)  O-(1-methyl-heptyl)-S-ethyl-S-phenyl-phosphorodithiolate
(20₂)  O-(1,2,2-trimethyl-propyl)-S-methyl-S-phenylphosphorodithiolate These compounds significantly have a similar fungicidal activity to that of compound (2).

EXAMPLE 5

(16₂)
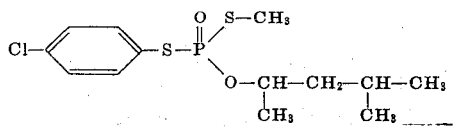

16.7 g of the sodium salt of 4-chloro-thiophenol are dissolved in 200 ml of methyl ethyl ketone. To this solution, 23 g of O-(1,3-dimethyl-butyl)-S-methyl-thiolphosphoryl chloride are added dropwise while stirring. The mixture is stirred for 1 hour at room temperature and for a further 8 hours at a temperature of 60°C to complete the reaction. The inorganic salt formed is separated by filtration. The methyl ethyl ketone is distilled off and the residue is dissolved in ether. The resulting ether solution is washed with a 1 percent aqueous solution of sodium carbonate and thereafter with water, and is then dehydrated over anhydrous sodium sulfate. Upon distilling off the ether, 27 g of pale yellowish oily O-(1,3-dimethyl-butyl)-S-methyl-S-(4'-chloro-phenyl)-phosphorodithiolate, i.e. O-(1,3-dimethyl-butyl)-S-methyl-S-(4'-chloro-phenyl)-dithiolphosphoric acid ester, are obtained.

$n_D^{21} = 1.5570$

| Analysis | Cl | S | P |
|---|---|---|---|
| Calculated: | 10.5% | 18.9% | 9.2% |
| Found | 10.7% | 18.8% | 8.9% |

According to the same procedure as noted above, when the sodium salt of 4-methyl-thiophenol is used instead of the sodium salt of 4-chloro-thiophenol, the non-distillable pale yellowish oily O-(1,3-dimethyl-butyl)-S-methyl-S-(4'-methyl-phenyl)-phosphorodithiolate (27₁), which has a similar fungicidal activity to that of compound (16₂), is obtained at 160°C/0.1 mm Hg.

The following Table 3 illustrates appropriate data for typical compounds according to the present invention.

TABLE 4

| Compound No. | Structural formula | Physical property |
|---|---|---|
| (2₄) | phenyl-S-P(=O)(S-CH₃)(O-CH(CH₃)-CH₂-CH(CH₃)-CH₃) | $n_D^{21} = 1.5582$ |
| (1₃) | phenyl-S-P(=O)(S-CH₃)(O-CH₂-CH(CH₃)-CH₃) | $n_D^{22} = 1.5730$ |
| (3₅) | phenyl-S-P(=O)(S-C₂H₅)(O-CH(CH₃)-CH₂-CH₃) | $n_D^{20} = 1.5622$ |
| (16₃) | Cl-phenyl-S-P(=O)(S-CH₃)(O-CH(CH₃)-CH₃-CH(CH₃)-CH₃) | $n_D^{21} = 1.5570$ |
| (4₃) | Cl-phenyl-S-P(=O)(S-CH₃)(O-CH₂-CH(CH₃)-CH₃) | $n_D^{22} = 1.5764$ |
| (24₂) | phenyl-S-P(=O)(S-C₃H₇-iso)(O-CH₂-CH(CH₃)-CH₃) | Oil. |
| (25₂) | CH₃-phenyl-S-P(=O)(S-CH₃)(O-CH₂-CH(CH₃)-CH₃) | Oil. |
| (6₃) | CH₃-phenyl-S-P(=O)(S-C₂H₅)(O-CH₂-CH(CH₃)-CH₃) | Oil. |
| (7₃) | phenyl-S-P(=O)(S-C₂H₅)(O-C₈H₁₇-n) | Oil. |
| (8₁) | phenyl-S-P(=O)(S-C₂H₅)(O-CH(CH₃)-(CH₂)₄-CH₃) | Oil. |

TABLE 4—Continued

| Compound No. | Structural formula | Physical property |
|---|---|---|
| (9₂) | CH₃—CH₂—CH—CH₂—O, CH₂, CH₃ CH₃—S, P(=O)—S—C₆H₄—Cl | $n_D^{25}=1.5600$ |
| (10₂) | CH₃—CH₂—CH—CH₂—O, CH₂, CH₃ C₂H₅—S, P(=O)—S—C₆H₄—Cl | $n_D^{25}=1.5539$ |
| (11₂) | CH₃—CH₂—CH—CH₂—O, CH₂, CH₃ C₂H₅—S, P(=O)—S—C₆H₅ | $n_D^{25}=1.5469$ |
| (12₂) | CH₃—CH₂—CH—CH₂—O, CH₂, CH₃ CH₃—S, P(=O)—S—C₆H₅ | $n_D^{25}=1.5524$ |
| (13₂) | CH₃, CH₃—CH₂—C(CH₃)—CH₂—O—P(=O)(S—CH₃)—S—C₆H₅ | $n_D^{20}=1.5541$ |
| (14₂) | CH₃, CH₃—CH₂—C(CH₃)—CH₂—O—P(=O)(S—C₂H₅)—S—C₆H₄—Cl | $n_D^{23}=1.5572$ |
| (15₂) | CH₃, CH₃—CH₂—C(CH₃)—CH₂—O—P(=O)(S—C₂H₅)—S—C₆H₅ | $n_D^{23}=1.5572$ |
| (22₂) | CH₃, CH₃, CH₃—CH—CH₂—CH—O—P(=O)(S—C₂H₅)—S—C₆H₄—Cl | $n_D^{25}=1.5515$ |
| (17₂) | CH₃ CH₃, CH₃—C(CH₃)—CH—O—P(=O)(S—C₂H₅)—S—C₆H₄—Cl | $n_D^{25}=1.5580$ |
| (18₂) | CH₃ CH₃, CH₃—CH—CH₂—CH—O—P(=O)(S—C₂H₅)—S—C₆H₅ | $n_D^{25}=1.5430$ |
| (19₂) | CH₃ CH₃, CH₃—C(CH₃)—CH—O—P(=O)(S—C₂H₅)—S—C₆H₅ | $n_D^{25}=1.5467$ |
| (20₃) | CH₃ CH₃, CH₃—C(CH₃)—CH—O—P(=O)(S—CH₃)—S—C₆H₅ | $n_D^{25}=1.5542$ |
| (21₂) | CH₃ CH₃, CH₃—C(CH₃)—CH—O—P(=O)(S—CH₃)—S—C₆H₄—Cl | $n_D^{25}=1.5655$ |
| (5₂) | CH₃, CH₃—CH₂—CH—O—P(=O)(S—C₂H₅)—S—C₆H₄—Cl | $n_D^{20}=1.5701$ |
| (23₂) | CH₂, CH₃—CH₂—C(CH₃)—CH₂—O—P(=O)(S—CH₃)—S—C₆H₄—Cl | $n_D^{23}=1.5630$ |

These compounds may be designated:
(2₄) O-(1,3-dimethyl-butyl)-S-methyl-S-phenyl-phosphorodithiolate
(1₃) O-iso-butyl-S-methyl-S-phenyl-phosphorodithiolate
(3₅) O-sec-butyl-S-ethyl-S-phenyl-phosphorodithiolate
(16₃) O-(1,3-dimethyl-butyl)-S-methyl-S-(4-chloro-phenyl)-phosphorodithiolate
(4₃) O-iso-butyl-S-methyl-S-(4-chloro-phenyl)-phosphorodithiolate
(24₂) O-iso-butyl-S-iso-propyl-S-phenyl-phosphorodithiolate
(25₂) O-iso-butyl-S-methyl-S-(4-methyl-phenyl)-phosphorodithiolate
(6₃) O-iso-butyl-S-ethyl-S-(4-methyl-phenyl)-phosphorodithiolate
(7₃) O-n-octyl-S-ethyl-S-phenyl-phosphorodithiolate
(8₄) O-(1-methyl-hexyl)-S-ethyl-S-phenyl-phosphorodithiolate
(9₂) O-(2-ethyl-butyl)-S-methyl-S-(4-chloro-phenyl)-phosphorodithiolate
(10₂) O-(2-ethyl-butyl)-S-ethyl-S-(4-chloro-phenyl)-phosphoro-dithiolate
(11₂) O-(2-ethyl-butyl)-S-ethyl-S-phenyl-phosphorodithiolate
(12₂) O-(2-ethyl-butyl)-S-methyl-S-phenyl-phosphorodithiolate
(13₂) O-(2,2-dimethyl-butyl)-S-methyl-S-phenyl-phosphorodithiolate
(14₂) O-(2,2-dimethyl-butyl)-S-ethyl-S-(4-chloro-phenyl)-phosphorodithiolate
(15₂) O-(2,2-dimethyl-butyl)-S-ethyl-S-phenyl-phosphorodithiolate
(22₂) O-(1,3-dimethyl-butyl)-S-ethyl-S-(4-chloro-phenyl)-phosphorodithiolate
(17₂) O-(1,2,2-trimethyl-propyl)-S-ethyl-S-(4-chloro-phenyl)-phosphorodithiolate
(18₂) O-(1,3-dimethyl-butyl)-S-ethyl-S-phenyl-phosphorodithiolate
(19₂) O-(1,2,2-trimethyl-propyl)-S-ethyl-S-phenyl-phosphorodithiolate
(20₃) O-(1,2,2-trimethyl-propyl)-S-methyl-S-phenyl-phosphorodithiolate
(21₂) O-(1,2,2-trimethyl-propyl)-S-methyl-S-(4-chloro-phenyl)-phosphorodithiolate
(5₂) O-sec.-butyl-S-ethyl-S-(4-chloro-phenyl)-phosphorodithiolate
(23₂) O-(2,2-dimethyl-butyl)-S-methyl-S-(4-chloro-phenyl)phosphorodithiolate It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

What is claimed is:

1. Phosphorodithiolate of the formula

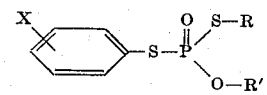

in which R is alkyl of one–three carbon atoms, R' is selected from the group consisting of branched chain alkyl of four–eight carbon atoms and straight chain alkyl of seven–eight carbon atoms, and X is selected from the group consisting of hydrogen and methyl.

2. Compound according to claim 1 wherein such compound is O-iso-butyl-S-methyl-S-phenyl-phosphorodithiolate.

3. Compound according to claim 1 wherein such compound is O-sec-butyl-S-ethyl-S-phenyl-phosphorodithiolate.

4. Compound according to claim 1 wherein such compound is O-sec.-butyl-S-ethyl-S-(4-chloro-phenyl)-phosphorodithiolate.

5. Compound according to claim 1 wherein such compound is O-(1,3-dimethyl-butyl)-S-methyl-S-phenyl-phosphorodithiolate.

6. Compound according to claim 1 wherein such compound is O-(1,3-dimethyl-butyl)-S-ethyl-S-phenyl-phosphorodithiolate.

7. Compound according to claim 1 wherein such compound is O-(2,2-dimethyl-butyl)-S-methyl-S-phenyl-phosphorodithiolate.

8. Compound according to claim 1 wherein such compound is O-(2,2-dimethyl-butyl)-S-ethyl-S-phenyl-phosphorodithiolate.

9. Compound according to claim 1 wherein such compound is O-(2-ethyl-butyl)-S-methyl-S-phenyl-phosphorodithiolate.

10. Compound according to claim 1 wherein such compound is O-(2-ethyl-butyl)-S-ethyl-S-phenyl-phosphorodithiolate.

11. Compound according to claim 1 wherein such compound is O-(1,2,2-trimethyl-propyl)-S-methyl-S-phenyl-phosphorodithiolate.

* * * * *

UNITED STATES PATENT OFFICE
CERTIFICATE OF CORRECTION

Patent No. 3,686,369          Dated August 22, 1972

Inventor(s) Hellmutt Hoffmann et al

It is certified that error appears in the above-identified patent and that said Letters Patent are hereby corrected as shown below:

Col. 2, line 61

"methyl, 1-4 and iso-propyl," should be -- methyl, ethyl, n- and iso-propyl, --

Col. 3, line 37

"O-i-methyl-" should be -- O-1-methyl- --

Col. 4, line 3

"dimethylbenxylamine" should be -- dimethylbenzylamine --

Col. 9, Compound No. 5

" P$\diagup$S-C$_2$-H$_5$ " should be -- P$\diagup$S-C$_2$H$_5$ --

Col. 9, Compound No. 7

" $\diagdown$O-C$_8$H$_{17}$-" should be -- $\diagdown$O-C$_8$H$_{17}$-n --

UNITED STATES PATENT OFFICE
CERTIFICATE OF CORRECTION

Patent No. 3,686,369                     Dated August 22, 1972

Inventor(s) Hellmutt Hoffmann et al         - 2 -

It is certified that error appears in the above-identified patent and that said Letters Patent are hereby corrected as shown below:

Col. 9, Compount No. 9

"$CH_3-CH_2-CH-CH_2\diagdown\underset{P}{\overset{O}{\underset{\|}{}}}$" should be -- $CH_3-CH_2-CH-CH_2-O\diagdown\underset{P}{\overset{O}{\underset{\|}{}}}$ --

Col. 10, Compound 12 omit the second

"0.025          o          0"

Col. 12, Compound 17

"0.015" should be -- 0.025 --

Col. 12, Table 2

Column heading "Pellicularia sasskii" should be -- Pellicularia sasakii"

Col. 12, Table 2

Under heading "Elsinol ...", the second number, "40" should be -- 50 --.

UNITED STATES PATENT OFFICE
CERTIFICATE OF CORRECTION

Patent No. 3,686,369      Dated August 22, 1972

Inventor(s) Hellmutt Hoffmann et al.     - 4 -

It is certified that error appears in the above-identified patent and that said Letters Patent are hereby corrected as shown below:

Col. 17, Compound $23_2$

Col. 20, line 20

"one-three" should be -- one-two --

Col. 20, line 22

"four-eight" should be -- four-six --

Signed and sealed this 23rd day of January 1973.

(SEAL)
Attest:

EDWARD M. FLETCHER, JR.          ROBERT GOTTSCHALK
Attesting Officer                Commissioner of Patents

PO-1050
(5/69)

UNITED STATES PATENT OFFICE
CERTIFICATE OF CORRECTION

Patent No. 3,686,372                               Dated   August 22, 1972

Inventor(s)  John C. Hiatt and John P. Luker

It is certified that error appears in the above-identified patent and that said Letters Patent are hereby corrected as shown below:

Column 3, line 24 - "though" should be --thought--.

Column 3, line 47 - after "mesh." delete "80".

Column 5, line 23 - "9 1/2 by 34° inch" should be --9 1/2' by 34'--.

Column 5, line 24 - "10 by 15 1/2 inch" should be --10' by 15 1/2'--.

Column 5, line 43 - after "slurry" insert --.--.

Column 6, line 5 - "$Al_2O_3$" should be moved into line under the Heading entitled "Composition".

Column 6, line 6 - "$Fe_2O_3$" should be moved into line under the Heading entitled "Composition".

Column 6, line 8 - "MgO" should be moved into line under the heading entitled "Composition".

Column 6, line 9 - delete "Total: 100.0" and insert --0.3-- under the heading entitled "% By Weight".

Column 6, line 10 - under the column entitled "% By Weight" insert --100.0--.

Column 8, line 15 - "-30" should be --+30--.

Signed and sealed this 9th day of January 1973.

(SEAL)
Attest:

EDWARD M. FLETCHER, JR.           ROBERT GOTTSCHALK
Attesting Officer                 Commissioner of Patents